No. 786,412. PATENTED APR. 4, 1905.
H. H. CUTLER.
MAGNETIC CLUTCH OR SPEED ACCELERATOR.
APPLICATION FILED MAR. 2, 1904.
2 SHEETS—SHEET 1.
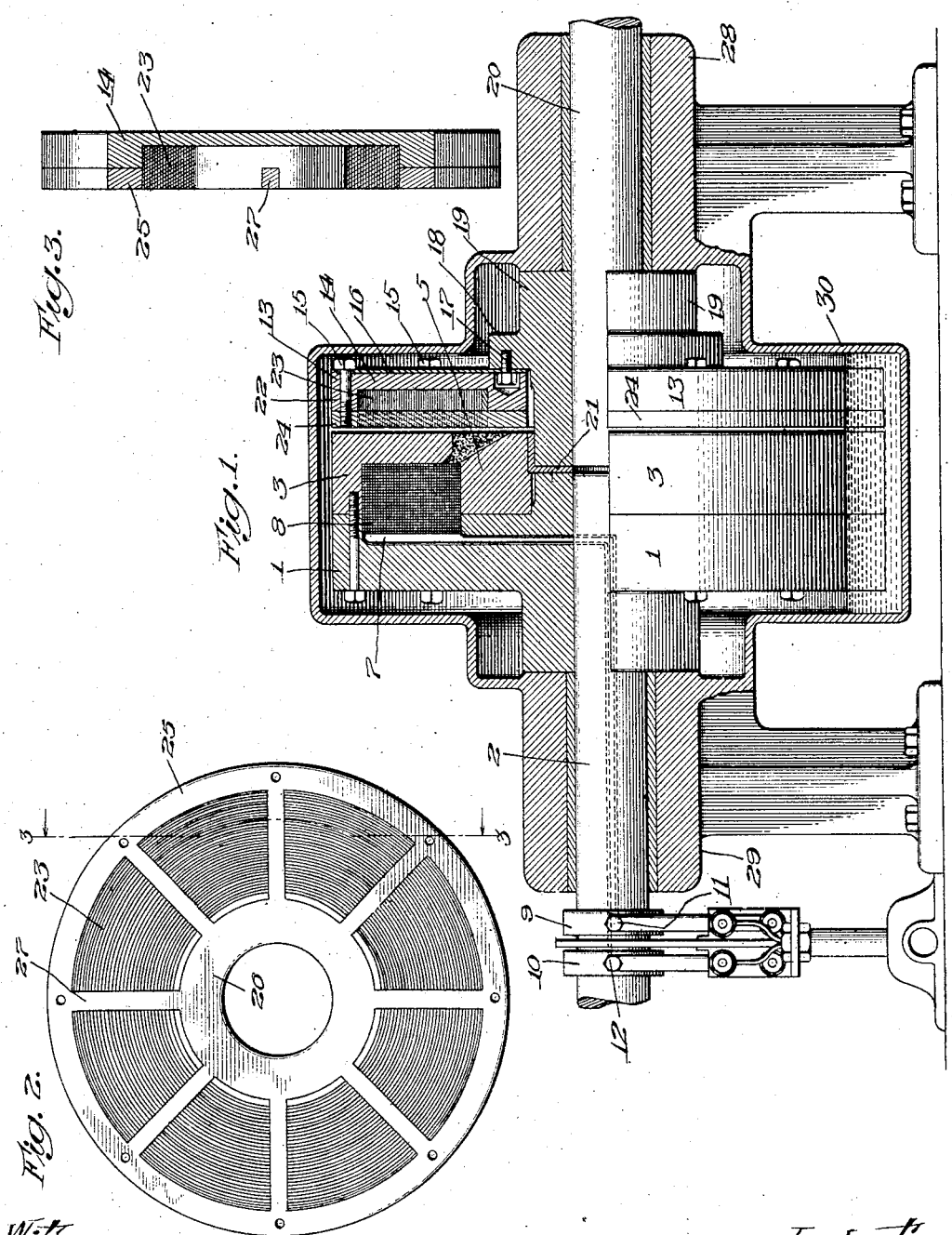
Witnesses:
Robert F. Weir
W. Perry Hahn
Inventor:
Henry H. Cutler
By Jones & Addington
Attorneys No. 786,412. PATENTED APR. 4, 1905.
H. H. CUTLER.
MAGNETIC CLUTCH OR SPEED ACCELERATOR.
APPLICATION FILED MAR. 2, 1904.
2 SHEETS—SHEET 2.
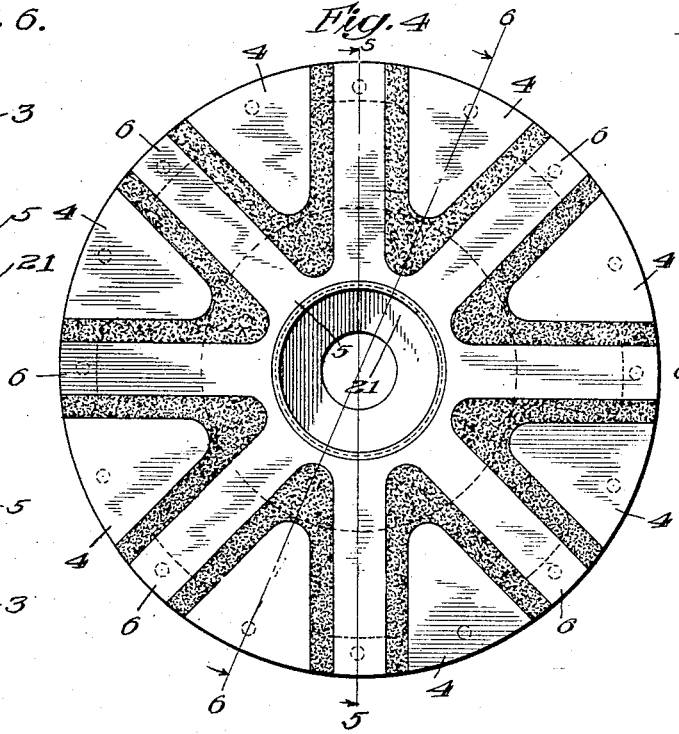
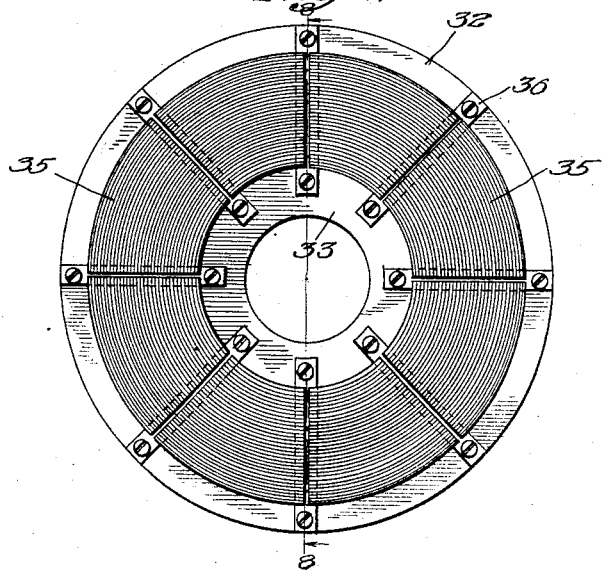
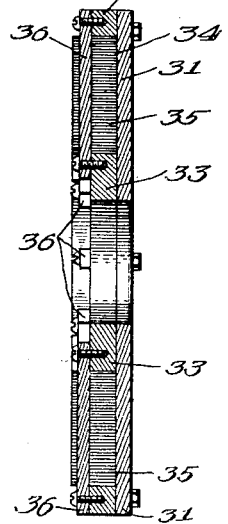
Witnesses:
Robert H. Weir
W. Perry Hahn
Inventor:
Henry H. Cutler,
By Jones & Addington
Attorneys.

No. 786,412.                                              Patented April 4, 1905.

UNITED STATES PATENT OFFICE.

HENRY H. CUTLER, OF MILWAUKEE, WISCONSIN, ASSIGNOR TO ARNOLD MAGNETIC CLUTCH COMPANY, OF MILWAUKEE, WISCONSIN, A CORPORATION OF WISCONSIN.

MAGNETIC CLUTCH OR SPEED-ACCELERATOR.

SPECIFICATION forming part of Letters Patent No. 786,412, dated April 4, 1905.

Application filed March 2, 1904. Serial No. 196,190.

*To all whom it may concern:*

Be it known that I, HENRY H. CUTLER, a citizen of the United States, residing at Milwaukee, in the county of Milwaukee and State of Wisconsin, have invented new and useful Improvements in Magnetic Clutches or Speed-Accelerators, of which the following is a full, clear, concise, and exact description, reference being had to the accompanying drawings, forming a part of this specification.

My invention relates to magnetic clutches or speed-accelerators—that is, a device comprising a driving part adapted to be connected with a motor or prime mover and a driven part adapted to be connected with the mechanism to be driven, whereby the driven part may be rotated at any desired speed equal to or less than that of the driving part.

In an application filed by me August 5, 1903, Serial No. 168,388, I have described and claimed an improved form of magnetic clutch or speed-accelerator, and the present invention relates to one of the several modifications or embodiments of which the generic invention set forth in said application is susceptible. In said application above mentioned I have shown a form of clutch or accelerator in which a winding is provided on the primary or inducing member adapted to inductively influence a suitable secondary or induced member which is shown as a disk-like armature constructed of a single piece of material, such as iron.

In the present invention I contemplate constructing the armature or induced member in such a manner as to form special paths therein for the torque-producing induced currents created therein by the inductive action of the primary or inducing member.

In the drawings, showing the preferred embodiment of my invention, Figure 1 is a partial section of my improved clutch. Fig. 2 is a face view of the secondary or induced member of the clutch. Fig. 3 is a section taken on the line 3 3 of Fig. 2. Fig. 4 is a face view of the primary or inducing member of the clutch. Fig. 5 is a section taken on the line 5 5 of Fig. 4. Fig. 6 is a section taken on the line 6 6 of Fig. 4. Fig. 7 is a modification of the secondary or induced member, and Fig. 8 is a section taken on the line 8 8 of Fig. 7.

In the construction which I have worked out as the preferred embodiment of my invention the field-magnet or inducing member of the clutch comprises, as illustrated, a back plate or disk 1, which is mounted upon a shaft 2. To the face of this disk or back plate 1 rings are secured. One of these rings, 3, is provided with a plurality of inwardly-extending pole-pieces 4 4, these pole-pieces being in the present instance substantially triangular in shape. The other ring, 5, is provided with radially-extending pieces 6 6, which, as shown, are substantially rectilinear in shape and which when the rings are placed together, as shown in Fig. 4, are adapted to rest in the space between the triangular pole-piece above mentioned. An annular channel 7 is provided in the face of the back plate 1, and the rings 3 and 5 when placed together form an annular channel which coöperates with the channel 7 in forming a chamber for the reception of the annular winding 8 of the clutch. The terminals of the winding or coil 8 extend through suitable openings in the back plate 1 and in the shaft 2 and are connected, respectively, with rings 9 and 10, upon which rest brushes 11 and 12, respectively, which brushes are connected with any suitable source of supply for furnishing current to the clutch-winding.

The spaces between the poles carried on the rings 3 and 5 are filled with Babbitt or other non-magnetic material. This material serves to entirely inclose the windings, and thus protect the same from injury and also from the oil employed for lubricating purposes. Moreover, the Babbitt metal affords with the polar face a continuous frictional surface against which the face of the armature is adapted to bear.

The armature member 13 is of annular form and in the present instance comprises a disk 14, secured, by means of bolts 15 15, to the periphery of a steel disk 16, the inner edge of which is secured by means of bolts 17 to a flange 18, carried upon the hub 19, the hub 19 being keyed to the shaft 20. A cup 21 fits in a suitable opening in the magnet member, and the end of the shaft is adapted to fit in this cup, whereby the shafts 2 and 20 are held in alinement.

In the front face of the disk 14 is formed a recess 22, within which is adapted to be fitted a laminated filling 23. This filling preferably consists of a strip of soft iron wound into a single disk, which is adapted to be placed within the recess 22 and be held therein by a front plate 24, secured in position by the bolts 15. The front plate is preferably formed of an outer ring 25 and an inner ring 26, the two being connected by radial arms 27, which arms are adapted to lie in channels formed in the face of the laminated filling 23 and form, together with the rings 25 and 26, conducting-paths for the currents induced in the secondary member. They also serve to hold the laminated filling in place. The laminated filling prevents the formation of vagrant eddy-currents and limits the flow of the induced torque-producing currents to the special paths formed by the rings and radial arms.

The shafts 2 and 20 are journaled in suitable bearings 28 and 29, and these bearings are preferably formed continuous with an inclosed shell 30, which serves the double purpose of excluding dust and dirt and retaining the oil. By the employment of this shell the clutch may be subjected to an oil-bath. Oil placed in the shell will be picked up by the periphery of the clutch and will be carried to the frictional surfaces to the armature and the magnetic member.

In Figs. 7 and 8 I have illustrated a modified construction of the armature or induced member of the clutch. In this construction I provide a disk 31, which is adapted to be bolted to the spring-disk 16 and to which are bolted an outer ring 32 and an inner ring 33, forming between them a recess 34. A laminated filling 35 is adapted to be placed in the recess 34, and radial bars 36, passing through channels cut in the laminated filling, are bolted to the two rings 32 and 33 and form conductors to electrically connect the rings, thereby forming conducting-paths for the currents induced in the secondary member. The channels cut in this filling are at their bottom large enough to accommodate the bars 36; but at their upper portion are mere slots which extend to the face of the filling.

It will be seen that by the construction above set forth special paths in the armature are formed, so that the magnetism will induce currents to flow in reasonably-effective paths for torque production, greatly increasing the efficiency of a clutch of this character.

While I have shown and described one form of my invention, it will be understood that I do not intend to limit myself to the particular construction set forth in this specification, as there are numerous changes which may be made without departing from the spirit of my invention.

Having described my invention, what I claim as new, and desire to secure by Letters Patent, is—

1. The combination with a primary member, of a secondary member adapted to be inductively influenced thereby, said secondary member having special paths for the induced currents set up therein and adapted to rest in mechanical contact with the primary member whereby air-gaps in the magnetic circuit are eliminated.

2. The combination with a primary clutch member having suitable energizing-windings, of a secondary clutch member adapted to be inductively influenced thereby, said secondary member having special paths for the induced currents set up therein and adapted to frictionally engage the primary member, whereby one of said members, the driven member is accelerated through the combined influence of induction and friction.

3. The combination with a primary member having suitable energizing-windings, of a secondary member adapted to be inductively influenced thereby and having special paths for the induced currents set up therein, one of said members, the driven member being accelerated through the combined and continuously-imposed effects of induction and friction.

4. The combination with a primary or inducting clutch member having suitable energizing-windings, and a plurality of polar surfaces, of a secondary or induced member adapted to be inductively influenced by said primary member and having special paths for the induced currents set up therein, said secondary member being capable of exerting an axial pressure upon said primary member.

5. The combination with a primary member having suitable energizing-windings, of a secondary member adapted to be inductively influenced thereby to create torque-producing currents, said member having a laminated body and special paths formed therein for the torque-producing induced currents, said members being axially movable relatively.

6. The combination with a primary member having suitable energizing-windings, of a secondary member adapted to be inductively influenced thereby, to create torque-producing currents, said member being formed of laminated material and having special paths formed therein for the torque-producing induced currents, said members being axially movable relatively.

7. The combination with a primary member having suitable energizing-windings, of a secondary member adapted to be inductively influenced thereby, said member comprising a back plate having a laminated face and having special paths formed therein for the torque-producing induced currents.

8. The combination with a primary member having suitable windings, of a secondary member adapted to be inductively influenced thereby to create torque-producing currents, said member comprising a back plate and a laminated face.

9. The combination with a primary member having suitable energizing-windings, of a secondary member adapted to be inductively influenced thereby to create torque-producing currents, said member comprising a back plate having a suitable recess in the face thereof, and a laminated filling for said recess.

10. The combination with a primary member having suitable energizing-windings, of a secondary member adapted to be inductively influenced thereby, said member comprising a back plate having a suitable recess therein, a laminated filling for said recess having special paths formed therein for the torque-producing induced currents.

11. The combination with a primary member having suitable energizing-windings, of a secondary member adapted to be inductively influenced thereby, said secondary member comprising a back plate having a suitable recess, a laminated filling for said recess, an outer and inner ring connected to said plate and radial arms connecting said rings and adapted to fit in channels formed in said filling whereby special paths are formed for the torque-producing induced currents.

12. The combination with a primary member having an annular winding, and a plurality of pole-pieces alternating in polarity, of a secondary member adapted to be inductively influenced by said primary member and having special paths for the induced currents set up therein.

13. The combination with a primary clutch member provided with suitable polar surfaces, of a secondary clutch member adapted to be inductively influenced thereby and having special paths for the induced currents, set up therein, the polar surfaces of said primary member being arranged to constrain the lines of force to travel in the most advantageous paths for producing the maximum turning effort.

14. The combination with a primary clutch member having suitable polar surfaces, of a secondary clutch member adapted to be inductively influenced thereby and having special paths for the induced currents set up therein, said polar surfaces of the primary member being disposed to constrain the lines of force to pass in substantially tangential paths in traveling from pole to pole through said secondary member.

15. The combination with a primary clutch member having suitable polar surfaces, of a secondary clutch member adapted to be inductively influenced thereby and having special paths for the induced currents set up therein, said polar surfaces of the primary member being alternately of opposite polarity and having their adjacent edges disposed substantially along the radial lines, whereby the lines of force are constrained to travel in substantially parallel paths in passing from pole to pole.

In testimony whereof I have hereunto subscribed my name in the presence of two witnesses.

HENRY H. CUTLER.

Witnesses:
THOMAS E. BARNUM,
L. D. ROWELL.